US009106101B2

(12) United States Patent
Senart et al.

(10) Patent No.: US 9,106,101 B2
(45) Date of Patent: Aug. 11, 2015

(54) ELECTRICAL DISTRIBUTION NETWORK IMPROVEMENT FOR PLUG-IN ELECTRIC VEHICLES

(75) Inventors: Aline Senart, Le Bar sur Loup (FR); Christian Souche, Le Cannet (FR); Scott Kurth, Arlington Heights, IL (US)

(73) Assignee: Accenture Global Services Limited, Dublin (IE)

( * ) Notice: Subject to any disclaimer, the term of this patent is extended or adjusted under 35 U.S.C. 154(b) by 440 days.

(21) Appl. No.: 13/415,517

(22) Filed: Mar. 8, 2012

(65) Prior Publication Data

US 2012/0271437 A1   Oct. 25, 2012

(30) Foreign Application Priority Data

Mar. 10, 2011 (EP) .................................. 11305260

(51) Int. Cl.
G06G 7/48 (2006.01)
H02J 3/14 (2006.01)
(Continued)

(52) U.S. Cl.
CPC ............... *H02J 3/14* (2013.01); *B60L 3/0046* (2013.01); *B60L 3/0069* (2013.01); *B60L 3/04* (2013.01); *B60L 11/184* (2013.01); *B60L 11/1816* (2013.01); *B60L 11/1824* (2013.01); *B60L 11/1842* (2013.01); *B60L 11/1844* (2013.01); *B60L 11/1846* (2013.01); *B60L 11/1848* (2013.01); *G06Q 10/06* (2013.01); *G06Q 50/06* (2013.01); *B60L 2230/16* (2013.01); *B60L 2230/40* (2013.01); *B60L 2240/72* (2013.01); *B60L 2260/44* (2013.01); *H02J 2003/003* (2013.01); *H02J 2003/007* (2013.01); *Y02B 70/3225* (2013.01); *Y02E 60/721* (2013.01); *Y02E 60/76* (2013.01); *Y02T 10/7005* (2013.01); *Y02T 10/7088* (2013.01); *Y02T 10/7291* (2013.01); *Y02T 90/121* (2013.01);
(Continued)

(58) Field of Classification Search
USPC ............................................................ 703/6
See application file for complete search history.

(56) References Cited

U.S. PATENT DOCUMENTS

2004/0236620 A1   11/2004   Chauhan et al.
2005/0033481 A1    2/2005   Budhraja et al.
(Continued)

FOREIGN PATENT DOCUMENTS

| EP | 2 081 273 A2 | 7/2009 |
| WO | WO 2008/006116 A2 | 1/2008 |
| WO | WO 2008/073453 A1 | 6/2008 |
| WO | WO 2009/079395 A1 | 6/2009 |

OTHER PUBLICATIONS

Kelly et al. ("Analyzing the Impacts of Plug-in Electric Vehicles on Distribution Networks in British Columbia", IEEE Electrical Power & Energy Conference, 2009).*

(Continued)

*Primary Examiner* — Omar Fernandez Rivas
*Assistant Examiner* — Iftekhar Khan
(74) *Attorney, Agent, or Firm* — Brinks Gilson & Lione (57) ABSTRACT

Electrical distribution network (EDN) improvement method for plug-in electric vehicles receives and stores in a database EDN configuration information, demography information and load information for simulating load of the EDN assets. The method dynamically updates the EDN configuration, demography information and/or load information to provide an efficient and customizable method of simulating a PEV load impact on an EDN configuration and apply improvements to the EDN in real time.

22 Claims, 7 Drawing Sheets

(51) Int. Cl.
G06Q 10/06 (2012.01)
G06Q 50/06 (2012.01)
B60L 3/00 (2006.01)
B60L 3/04 (2006.01)
B60L 11/18 (2006.01)
H02J 3/00 (2006.01)

(52) U.S. Cl.
CPC .............. *Y02T 90/128* (2013.01); *Y02T 90/14* (2013.01); *Y02T 90/163* (2013.01); *Y02T 90/169* (2013.01); *Y04S 10/126* (2013.01); *Y04S 10/54* (2013.01); *Y04S 10/60* (2013.01); *Y04S 20/222* (2013.01); *Y04S 30/14* (2013.01); *Y04S 40/22* (2013.01)

(56) References Cited

U.S. PATENT DOCUMENTS

2010/0217550 A1* 8/2010 Crabtree et al. ................ 702/62
2011/0071695 A1 3/2011 Kouroussis et al.
2011/0184586 A1* 7/2011 Asano et al. .................. 700/297

OTHER PUBLICATIONS

Clement-Nyns et al. Hereafter Clement-Nyns ("The Impact of Charging Plug-In Hybrid Electric Vehicles on a Residential Distribution Grid", IEEE Electrical Power & Energy Conference, 2010).*

Putrus et al. ("Impact of Electric Vehicles on Power Distribution Networks", IEEE, 2009).*

Liu et al. ("A Survey of PEV Impacts on Electric Utilities", IEEE, 2011).*

Curtin et al. ("Plug-in Hybrid Electric Vehicles", The University of Michigan, 2009).*

European Search Report for corresponding EP Application No. 11305260.9, dated Mar. 9, 2012, 5 pages.

Kevin Mets et al.; "Optimizing Smart Energy Control Strategies for Plug-in Hybrid Electric Vehicle Charging," 2010; retrieved from https://biblio.upent.be/input/download?func=downloadFile&filOId=9906848,recordOId=990665 on Jun. 29, 2012.

Chris Farmer et al.; "Modeling the Impact of Increasing PHEV Loads on the Distribution Infrastructure," 2010; retrieved from http://www.cems.uvm.edu/phines/publications/2010/farmer_2010_phev_distribution.pdf on Jun. 29, 2012.

Rashid A. Waraich et al.,"Plug-in Hybrid Electric Vehicles and Smart Grid: Investigations Based on a Micro-Simulation," 2009; retrieved from http://citeseerx.isx.psu.edu/viewdoc/summary?doi=10.1.1.164.9652 on Jun. 29, 2012.

Australia Patent Examination Report No. 1, dated Jun. 29, 2012, pp. 1-4, issued in Australian Application No. 2012201430, Offices of IP Australia, Woden ACT, Australia.

Australia Patent Examination Report No. 2, dated Aug. 21, 2012, pp. 1-2, issued in Australian Application No. 2012201430, Offices of IP Australia, Woden ACT, Australia.

Australia Patent Examination Report No. 3, dated Aug. 7, 2013, pp. 1-2, issued in Australian Application No. 2012201430, Offices of IP Australia, Woden ACT, Australia.

* cited by examiner

ELECTRICAL DISTRIBUTION NETWORK IMPROVEMENT FOR PLUG-IN ELECTRIC VEHICLES

RELATED APPLICATIONS

This application claims the benefit of the filing date of European Patent Application Number 11305260.9, filed Mar. 10, 2011, the disclosure of which is incorporated, in its entirety, by this reference.

BACKGROUND

1. Technical Field

This disclosure relates to a system for improving electrical distribution networks for plug-in electrical vehicles ("PEV").

2. Related Art

Businesses and governments are facing pressures from a business standpoint and from a political standpoint to reduce carbon emissions, secure energy independence, and support the automotive industry for more environmentally friendly means of transport. Many businesses and governments consider PEVs as a near-term technology to achieve these goals. Studies have shown that putting PEVs on the road could reduce U.S. greenhouse gas emissions by as much as 500 million metric tons a year by 2050. On the technological side, development of more efficient batteries and chargers allow car manufacturers to produce more efficient and affordable PEVs. As concerns for environmental issues rise, and as fuel prices are forecasted to increase worldwide, consumers are also becoming more interested in PEVs, leading to an increase in the forecast of the number of PEVs on the road.

The rising number of PEVs on the road and associated charging stations would generate an additional load that will be dynamically spread on the existing electrical distribution networks (EDN) both geographically and in time. Studies have shown that even a small penetration of PEVs would overload a local EDN and shorten the lifespan of the power equipment, such as switching equipments, transformers and regulators. However, more needs to be done to enable widespread use of PEVs.

Therefore, a need exists to address the problems noted above and others previously experienced.

SUMMARY

An electrical distribution network ("EDN") improvement system ("system") allows an operator of an EDN to efficiently and accurately simulate the impact of PEVs, dynamically modify the configuration of the EDN to account for different load scenarios, determine programs for improving the EDN for the PEVs. The system further enables applying the improving measures to the EDN.

An electrical distribution network improvement method includes receiving user input, wherein the user input comprises electrical distribution network (EDN) configuration information, demography information and load information, and storing the user input in a database. The method further includes performing a first simulation using a simulator based at least on the EDN configuration information, the demography information or the load information stored in the database to obtain a first simulation result, analyzing the first simulation result using an analytics engine to obtain a first interpretation result, determining at least one improvement program based on the first interpretation result, and updating the EDN configuration information based on the determined improvement program. The method also includes performing an improvement simulation based on the updated EDN configuration information; and applying the improvement program to the EDN.

Other systems, methods, features and will be, or will become, apparent to one with skill in the art upon examination of the following figures and detailed description. It is intended that all such additional systems, methods, and features be included within this description, be within the scope of the disclosure, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the disclosure. Moreover, in the figures, like referenced numerals designate corresponding parts throughout the different views.

DETAILED DESCRIPTION

Figure 1:
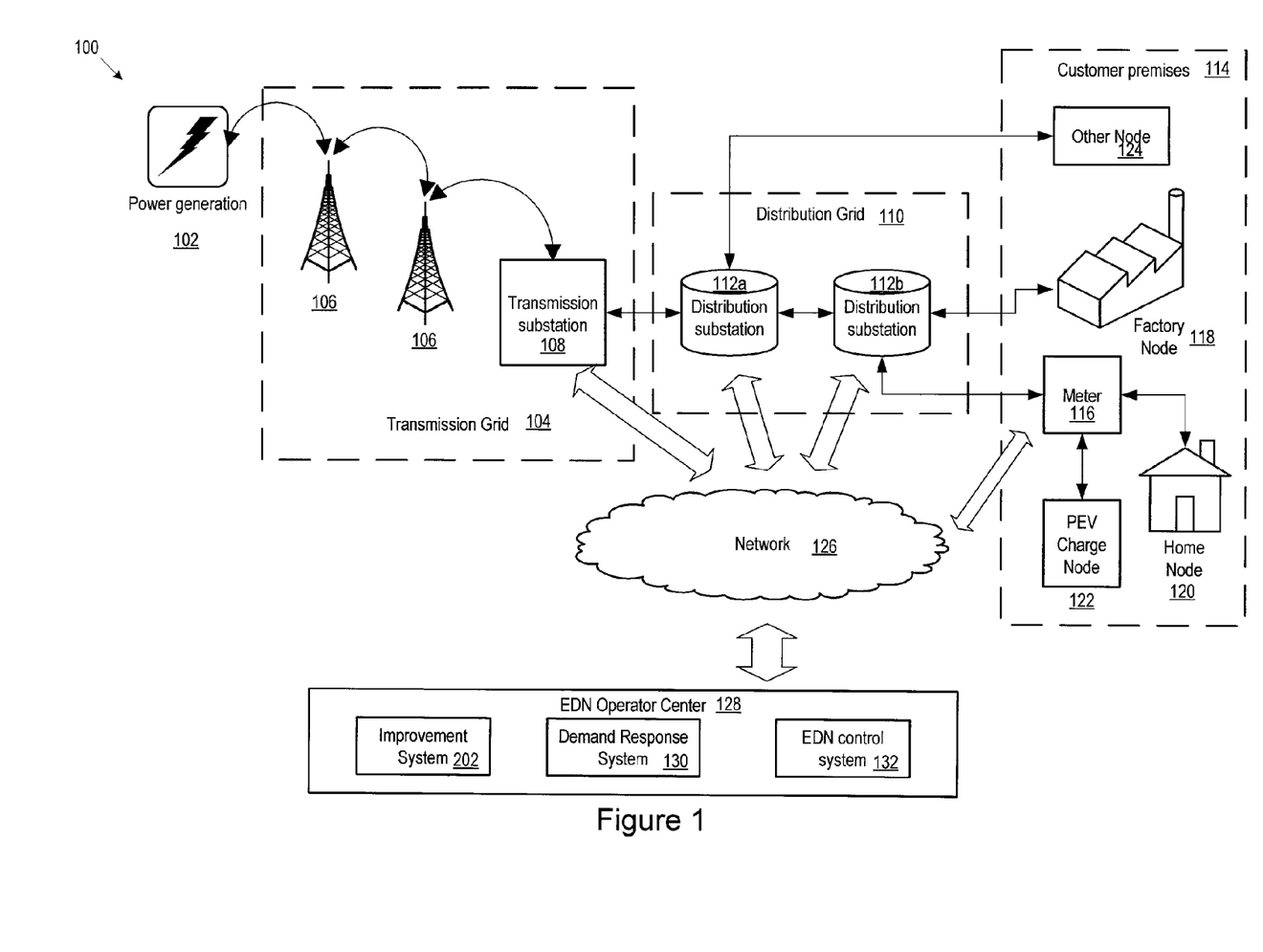
FIG. 1 shows diagram an electrical distribution network ("EDN").

FIG. 1 shows a diagram 100 of an electrical distribution network ("EDN"). The EDN may be a Smart grid that incorporates information and communication technologies at all levels of electricity transmission and distribution. The Smart grid may combine traditional power hardware with sensing and monitoring technology, information technology and communications to enhance electrical grid performance and support additional services to consumers. A Smart grid can precisely manage electrical power demand down to the residential level, network small scale distributed energy generation and storage devices, communicate information on operating status and needs, collect information on prices and grid conditions, and move the grid beyond central control to a collaborative network.

The EDN may include one or more power generation sources such as a power plant 102, a transmission grid 104, a distribution grid 110, and customer premises 114. The transmission grid 104 may include transmission towers 106 for transmitting electricity to transmission substation 108 within the transmission grid. The transmission substation 108 may transmit electricity to various distribution grids such as the distribution grid 110. The distribution grid 110 may include distribution substations such as substation 112a and 112b which in turn distribute electricity to various nodes in customer premises 114. The customer premises may include one or more meters 118 for metering electricity flowing to various nodes 118-124. The nodes may be, for example, a factory node 118, home node 120, PEV charge node 122 and other types of nodes 124.

The EDN may further include an EDN operator center 128. The EDN operator center 128 may communicate via a network 126 with various aspects of the EDN to control the configuration and operation of the EDN. For example, the EDN operator center 128 may communicate with the transmission substation 108, distribution substations 112a and 112b, meter 116 and various nodes 118-124 in order to control and change the operation and configuration of part or all of the EDN. For example, the EDN operator center 128 may alter the electrical distribution patterns among the different distribution substations 112a and 112b, adjust rates depending on the type of node or the time of the day, or identify any hardware maintenances that may be required. The EDN operator center 128 may include the system 202, a demand response system 130 and the EDN control system 132.

The demand response system 130 may control loads at one or more nodes, such as curtailing power used or implementing the vehicle-to-grid ("V2G") features. V2G will be discussed in more detail below. EDN control system 132 may receive instructions from the system 202, demand response system 130, or an operator to control the EDN.

Figure 2:
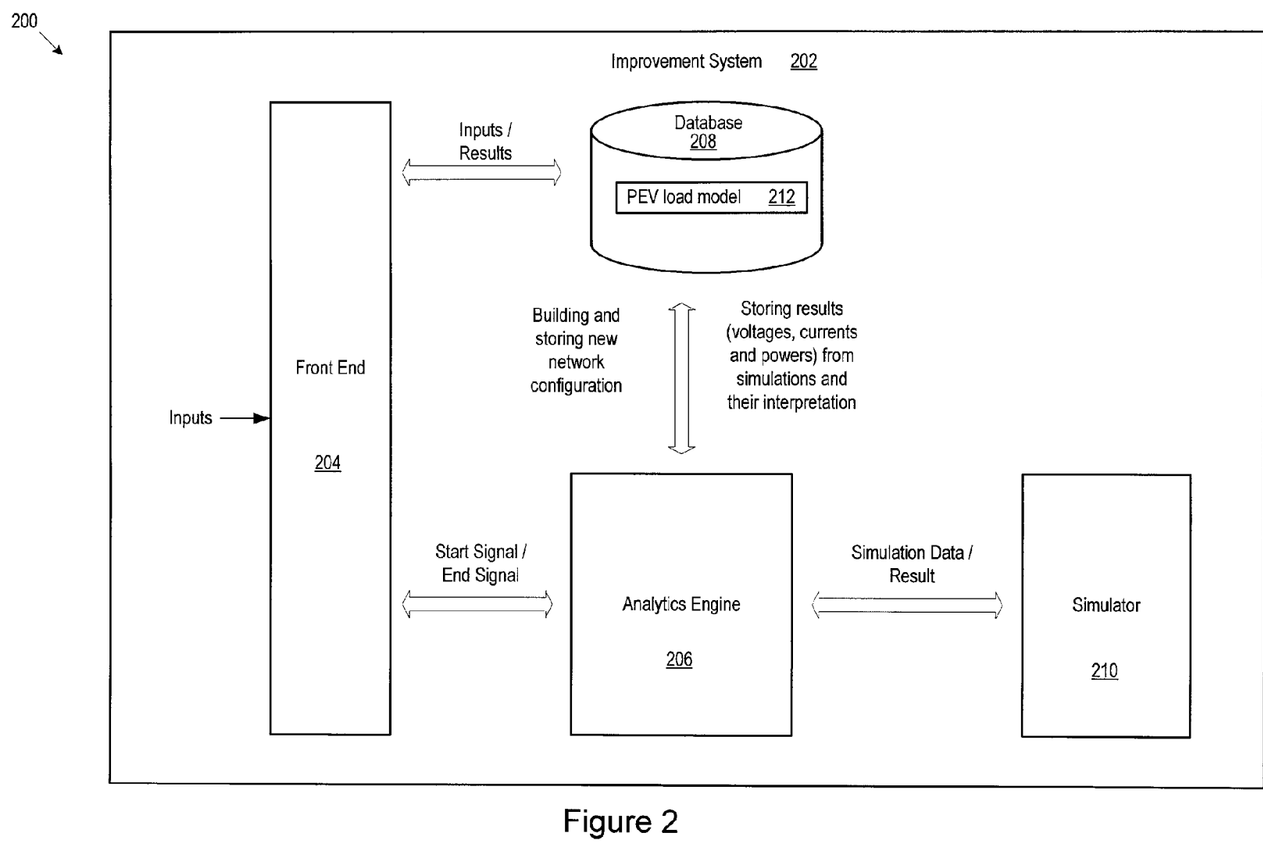
FIG. 2 shows a diagram of the electrical distribution network improvement system ("system").

FIG. 2 shows a diagram 200 of the system 202. The system 202 may be integrated into the EDN operation center 128, or may be implemented as a separate system which may communicate with the EDN. The system may include a front end 204, an analytics engine 206, a database 208, and a simulator 210.

The front end 204 may act as an interface for users to interact with the system 202. The front end 204 may be, for example, a web site, an application running on a smart phone or tablet PCs, which may be used by EDN operators. The front end 204 may be used to interact with users at a high level. The interaction may be done through screens. The screens may briefly explain key terms like Smart grid and PEVs, and may also describe the problem to the user. The screens may also allow the user to specify a set of parameters that will be used to simulate a specific EDN. The values specified by the user may be put in a specific table of the database and identified by a simulation identifier, which will be discussed in more detail below. The screens may also display a graphical view of the network and highlight the failure points and times. Further, the screens may display statistical results about a set of simulations that have been performed. The screens may also allow the user to apply one of the improvement programs established to help the EDN handle its new load and visualize the effects of the programs.

The analytics engine 206 may interact with the front end 204, the database 208 and the simulator 210. The analytics engine 206 may receive from the front end 204 a simulation identifier. The simulation identifier may be used to obtain, from the database 208, details about the simulations the system 202 is supposed to run. Those details may be stored in the database 208 through the front end 204. Alternatively, the details of the simulations may be loaded directly into the database 208. The analytics engine 206 may also send alerts to the front end 204 when a set of simulations are finished so that results may be highlighted in a graphical view displayed to the user.

The analytics engine 206 may interact with the database 208 to store the description of an EDN that will be simulated. The analytics engine may analyze the PEV load for the EDN (such as by accessing a PEV load model 212, as discussed below). The analysis may lead to one or more improvements of the EDN (such as changes or improvements in the structure of, configuration of, or devices in the EDN, or such as changes or improvements in the operation of the EDN, including selecting one or more nodes for demand response). The analysis of the EDN, using the analytics engine 206, may be prospective in order to make future changes to part of all of the EDN (such as upgrading hardware in the EDN). Or, the analysis of the EDN, using the analytics engine 206, may be performed in real-time in order to make real-time changes to part of all of the EDN (such as applying demand response to part of the EDN).

From one simulation to another, the EDN simulated may have a different configuration as far as assets characteristics and loads are concerned. The modifications from one configuration to another may be performed by the analytics engine 206, using user input parameters and a model such as PEV model 212 defining the load increase from one date to another. The PEV model 212 may be stored in and obtained from the database 208, or may be incorporated into the analytics engine 206.

Simulation data may be provided to the simulator 210 to run the simulation. Such data may include, for example, the EDN configuration, PEV load information and demography information. These data may be provided to the simulator 210 from the database 208. The simulation may perform a load flow calculation to simulate the load received on various assets of the EDN. The simulator 210 may be implemented, for example, using GridLab-D, or OpenDSS. The simulator 210 may also be implemented, for example, using the backward-sweep method. The simulation data may be passed to the simulator 210 in a variety of ways, for example, as a process call, a method call, or as a script file. After the simulation, the results may also be accessed in a variety of ways, for example, as a process call, a method call, or by generating a result file.

In an embodiment, before each simulation, the analytics engine may generate from the database, a script file describing the configuration of the EDN, and passes it to the simulator 210. The simulator 210 in turn runs the simulation to simulate the EDN operation for a specified period of time according to the script file and generates result files. The result files may include information on various aspects of the EDN, such as currents, voltages and powers values of the assets in the EDN.

After each simulation, the results may be stored in the database 208. Then, the analytics engine 206 may interpret the results and store the interpretation into the database 208. The interpretation may detect various issues within the EDN such as, for example, outages (for example, due to overcapacity) and line failure.

The analytics engine 206 may call the simulator 210 any time to run a specific configuration of an EDN. In an embodiment, in such a call, the analytics engine 206 may pass to the simulator 210 a description of the EDN to simulate. That description may be in a format compatible with the simulator 210. After the simulation, the analytics engine 206 may access the results files generated by the simulator 210. The analytics engine 206 may then parse the result files and store the results values in the database 208.

The database 208 may store information about the simulated EDNs and the simulation process itself. A data model of a classical EDN may be defined in the database 208. This model may include tables containing the characteristics of each asset of the EDN and the relationships between the assets. Receiving the simulation data from the user as user input and storing in the database allows the system 202 to dynamically simulate EDNs with varying configurations. Further, by storing the load information such as the PEV load model 212 and providing it to the simulator 210, the system 202 may also dynamically simulate a certain EDN configuration with varying load and demography information.

Therefore, the simulator 210 may receive simulation data describing a specific configuration of the EDN, demography and load information which may be efficiently tailored for specific needs. Further, the simulator 210 may simulate the EDN for a specific range of time and provide results. The results may be used by the analytics engine 206 to populate the database 208 with results from the simulation.

When modifying a configuration of an EDN to reflect additional loads, as discussed above, a PEV load model 212 may be used. PEV load and load coming from other sources like population growth or increase in individual power needs may be included in this load model.

The PEV load model 212 may account for factors such as, for example, energy consumption of a PEV, the charging profile of the batteries used and the driving behavior of the drivers. The load at each node and for each simulation may be computed with a set of formulae. These formulae may assume that base load and demography are known for each node at the starting date. In those formulae, "n" represents the date of simulation and "i" represents a loaded node. Those formulae may be used in the order at which they are listed below.

The first parameter that is computed is Demography-Weight. It represents the weight of each node as far as demography is concerned. The demography of a node is the number of people that receive their electric power from that node. The formula also uses the YearlyPopulationIncrease corresponding to the simulation date. The last element used by formula is ActivityInfluenceonDemography. It is a coefficient between 0 and 1, and represents the influence that the activity on a region has on its demography. For example, four regions may be defined as commercial, residential, agricultural and industrial.

$$DemographyWeight_i(n) = \frac{Load_i(StartDate)}{\sum_{i=0}^{N} Load_i(StartDate)} \cdot$$

$$(1 + YearlyPopulationIncrease)^n \cdot ActivityIndluenceonDemography(i)$$

Equation 1

Given the previous parameter, the overall demography at the start date and the YearlyPopulationIncrease, demography at each node may be computed according to Equation 2.

$$Demography_i(n) = \frac{DemographyWeight_i(n)}{\sum_{i=0}^{N} DemographyWeight_i(n)} \cdot$$

$$Demography(StartDate) \cdot (1 + YearlyPopulationIncrease)^n$$

Equation 2

PEVWeight, calculated by equation 3, represents the likelihood of each node to handle some PEVs. This is computed using the demography at each loaded node and ActivityinfluenceOnPEV, which is a coefficient between 0 and 1, representing the influence the activity in a region has on the number of PEVs used within a region.

$$PEVWeight_i(n) = \frac{Demography_i(n)}{\sum_{i=0}^{N} Demography_i(n)} \cdot ActivityIrfluenceonPEV_{(i)}$$

Equation 3

Equation 4 computes the number of PEVs that will be recycled during the year corresponding to the simulation date. It uses the life expectancy of each PEV and the number of cars sold for the year of simulation.

PEVToRecycle(n)=if((n−lifeExpectancy)>=StartDate)
  then NumberCarSales(n−lifeExpectancy)else 0
  where NumberCarSales(n)=NumberCarSales
  (StartDate)·(1+YearlyPopulationIncrease)$^n$     Equation 4

Equation 5 computes the number of PEVs for the current simulation date. That equation uses the number of PEVs of the previous simulation, the number of PEVs to recycle, the PEV penetration, the number of cars sold at the start date and the corresponding YearlyPopulationIncrease.

NumberPEV(n)=NumberPEV(n−1)−PEVToRecycle
  (n)+PEVPenetration(n)·NumberCarSales(Start-
  Date)·(1+YearlyPopulalationIncrease)$^n$     Equation 5

The parameter NumberPEV(n) used with PEVWeight at each node helps compute the number of PEVs at each node for the simulation date according to Equation 6.

$$NumberPEV_i(n) = \frac{PEVWeight_i(n)}{\sum_{i=0}^{N} PEVWeight_i(n)} \cdot NumberPEV(n)$$

Equation 6

Using Equations 1-6, all the parameters to compute the load at each node according to Equation 7 may be obtained. PEVLoad represents the average power used by a PEV.

Load$_i$(n)=Load$_i$(StartDate)·(1+YearlyLoadIncrease)$^n$·
  (1+YearlyPopulationIncrease)$^n$+NumberPEV$_i$(n)
  ·PEVLoad     Equation 7

Figure 3:
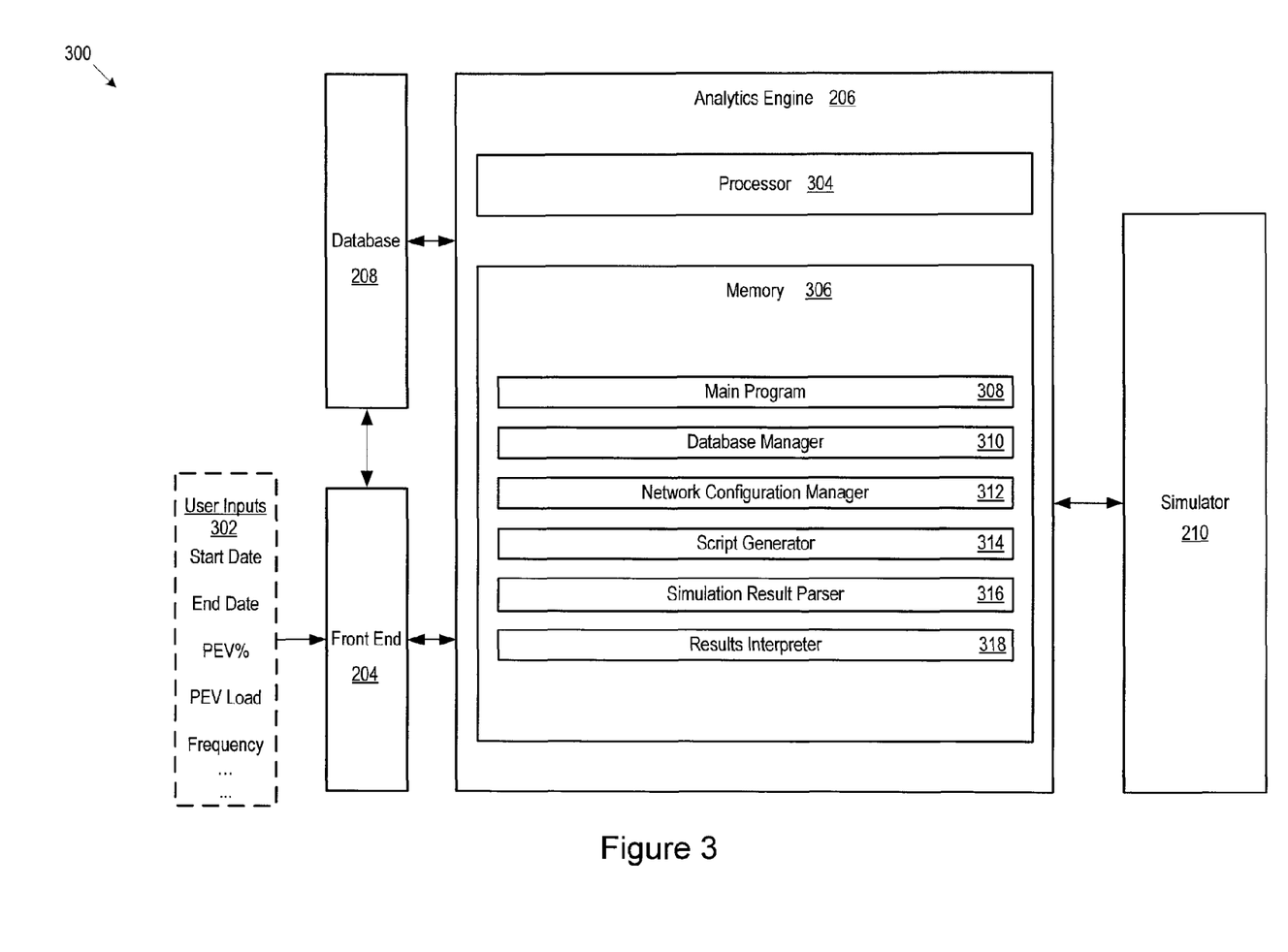
FIG. 3 shows a detailed view of the system.

FIG. 3 shows a detailed view 300 of the system 202. The front end 204 may be configured to receive user input 302 and store the user input in the database 208. For example, the user input 302 may be stored in a user input table in the database 208, and may be used to run the set of simulations for the specified dates. Tables 1-4 illustrate the exemplary user inputs 302.

TABLE 1

Input for the simulation configuration:

| Constant | Description |
|---|---|
| SimuID | Primary key of the table. |
| StartDate | Year when the simulation starts (e.g., 2010) |
| EndDate | Year when the simulation ends (e.g., 2060) |
| Frequency | Simulation frequency |
|  | Frequency ∈[Yearly, Quaterly, Monthly] |
| Network ID | Name of the EDN file to use for the simulation |

TABLE 2

Input on the PEV estimations

| Constant | Description |
|---|---|
| PEVFinalPenetrationRate | The PEV penetration rate estimated at EndDate (e.g., 50% in 2060) |
| PEVEvolutionRate | The estimated acceleration of the PEV penetration |
| InflexionDate | The estimated date when the acceleration of the PEV penetration is at its maximum |
| PEVLoad | Average energy consumed to charge a PEV (e.g., 24 kWh) |
| LifeExpectancy | Average life expectancy of a vehicle (electric or not) in year (e.g., 13) |

TABLE 2-continued

Input on the PEV estimations

| Constant | Description |
| --- | --- |
| YearlyLoadIncrease | The estimated percentage of increase of the load every year regardless PEV take-up (e.g., 0.03) |
| NumberCarSales | The total number of vehicles sold at StartDate (including ICE vehicles) |

TABLE 3

Input on the distribution network

| Constant | Description |
| --- | --- |
| N | The total number of nodes |
| InitialLoad$_i$ | The initial load on node i at StartDate |

TABLE 4

Input on the geographic area

| Constant | Description |
| --- | --- |
| TotalPopulation | The total population of the geographical area |
| YearlyPopulationIncrease | The estimated percentage of increase of the population every year (e.g., 0.02) |

SimuID: the primary key of the table. When the front end calls the Analytics engine, it passes the SimuID corresponding to the set of simulations to run.

StartDate: the date of the first simulation.

EndDate: the date of the last simulation.

Frequency: Is the simulation frequency. Frequency may be "Yearly", "Quarterly" or "Monthly".

NetworkID: is the name of the EDN to use for a set of simulations. Using this ID, other simulations using the same EDN configuration may be run at a later time without having to provide the full description of the EDN again.

PEVFinalPenetrationRate: The PEV penetration rate estimated at End Date. A typical value used may be 50% in 2060.

PEVEvolutionRate: The estimated acceleration of the PEV penetration.

InflexionDate: The estimated date when the acceleration of the PEV penetration is at its maximum.

The three previous criteria may be used to infer the penetration rate according to the simulation date. Equation 8 may be used:

$$PEVPenetration(n) = \frac{PEVFinalPenetrationRate}{1 + e^{((InflexionDate-n)*PEVEvolutionRate)}} \text{ with } n \in [StartDate, EndDate]$$

Equation 8

In addition, the following user inputs 302 may also be provided:

NumberCarSales: Number of cars sold at Start Date.

LifeExpectancy: Life expectancy of PEVs. The default value has been estimated to 13 years YearlyPopincrease: Yearly population increase used for the set of simulations. A typical value is 2%.

YearlyLoadIncrease: Yearly load increase used for the set of simulations. That parameter represents the increase in individual power needs. A typical value is 3%.

MembersPerHousehold: Number of members in a household. A typical value is 4.

The analytics engine 206 may include a processor 304 in communication with a memory 306 which may store various logic for operating the system 202 when executed by the processor 304. The memory 306 may include a main program 308 which governs the main operation of the analytics engine 206. The memory 306 may further include a database manager 310, network configuration manager 312, script generator 314, simulation result parser 316, and results interpreter 318. These may be implemented as computer programming software classes accessible by the main program 308.

The database manager 310 may be used at the beginning of each set of simulations. It accesses the database 208. A web service that exposes the database content may be used to access the database 208. The database manager may be implemented as a computer programming class.

The network configuration manager 312 may be used to put in the database 208 the description of the EDN to be used for a specific set of simulations. The network configuration manager 312 may interact with the database 208, parse the EDN description asset by asset and put the characteristics of the asset in the corresponding tables of the database 208. Access to the database 208 may be performed through a web service. The date of simulation may also be added in the tables as part of the primary key of each table.

In an initial base load simulation, if an XML file describing the demography of all the nodes of the EDN is provided, the network configuration manager 312 may be used to fill the demography parameter of tables representing node objects in the database 208. In an embodiment, a web service may be used to interact with the database 208.

If such XML file is not provided, the network configuration manager 312 may be compute the demography of each node of the EDN, assuming that the description of the EDN have been given with corresponding load at each node. Here, two options are shown below:

The first option is to use the total population for the simulated EDN input by the user via the front end 204. In this case, the population is spread over the EDN according to the load each node handles.

The second option is to infer the population from the loads assigned to each node. This option may use the LoadPerHousehold and MembersPerHousehold parameters described above.

Before each time a simulation is run, the network configuration manager 312 may be used to define a new configuration or update a previous simulation of the EDN. An initial configuration may be defined or a previous configuration updated to run a simulation for a specific date between the start and the end date. Running the initial simulation, updating the configuration and re-running the configuration may be iterated automatically. This process may be iterated based on predefined criteria. The predefined criteria may be, for example, equation 15 discussed below.

Further, the network configuration manager 312 may be used to compute the load corresponding to the current simulation date and to put that load in the corresponding tables of the database 208. The network configuration manager 312 may use the PEV load model 212 discussed above to compute the load.

In an embodiment, the memory 306 may also include a script generator 314 which may be used to generate a script file describing a configuration of the EDN that is being simulated. The script generator 314 may be implemented in a computer programming language class and may implement a function called Generate( ), which may access the database 208 through the web service, and which reviews table by table to write down assets configuration corresponding to the simulation date.

The previously generated script file may be passed to the simulator 210 and run. In an embodiment, the simulator 210 may provide the results by generating a result file. When the result files are generated, those files may be parsed to obtain the result values that may be stored at the corresponding places in the database 208. The memory 306 may further include a simulation result parser 316 which may implement a method call Parse( ) that may parse the result file, access the database 208 and store in the results of a simulation. The result file may be a comma separated value (CSV) file, and the simulation result parser 316 may be adapted to parse the CSV files. The simulation result parser may be integrated with the results interpreter 318, which will be described below.

As discussed above, in another embodiment, the simulation data such as the asset configuration which may be included in the script file generated in the embodiment above, may be provided to the simulator 210 as a method call or process call. The result of the simulator 210 may also be accessed by a method or process call to the simulator 210.

The results that have been input to the database 208 may be interpreted to determine if the EDN worked properly or not for the load (from population and PEVs) that has been applied. Results interpreter 318 may interpret the results. Depending on the embodiments discussed above, the results interpreter 318 may parse the simulation result file or call the simulator 210 to obtain the results of the simulation. The results interpreter 318 may also use the results parsed by the simulation result parser 316. The results interpreter 316 may implement a method called Interpret( ) to perform the interpretation. An approach which focuses on fuse and transformer assets may be used for the interpretation. Transformers have various properties, such as power rating and power. The power rating of a transformer represents the power it can handle indefinitely without any problem. Typically, the transformer can operate at 100% of its rating for years; however, the more power the transformer handles, the quicker it ages. For example, a transformer can handle 150% of its rating for some hours. The following are the equations which may be used in interpreting the results. The loads applied to the transformer are average values which the transformers are assumed to handle for long period up to one year.

If power<=power Rating the transformer works under its rating.

Equation 9

If power_Rating<power<=1.5*power_Rating, the transformer is working at its edge and is aging more quickly Equation 10

If power>1.5*power Rating, the transformer is too overloaded and will eventually fail. Upgrade needs to be planned (e.g., 160 kVA to 250 kVA)

Equation 11

When a fault occurs on the distribution system, it is interrupted and cleared by a fuse, recloser, or relayed circuit breaker. The current is compared to current_limit to detect a fault on a fuse. This is used to check if current increases are not too high on a line. If the current is too high, the line may be upgraded. The following equations may be used to interpret results from the fuse.

If current<=0.8 current limit the fuse works under its rating.

Equation 12

If current_limit*0.8<current<=1.0 current limit, the fuse is working at its edge and is aging more quickly.

Equation 13

If current>1.0*current limit, the fuse is too overloaded and will break down very soon Equation 14

The main program 308 governs the operation of the analytics engine 206. At the beginning the main program 308 may receive from the front end 204 the simulation identifier. The simulation identifier may be the primary key of the user_input table, which stores user input 302 for the set of simulations to run. Using the simulation identifier, the main program 308 may initiate the simulation and improvement of an EDN. Details of the main program 308 will be discussed below with reference to FIGS. 5 and 6.

Figure 4:
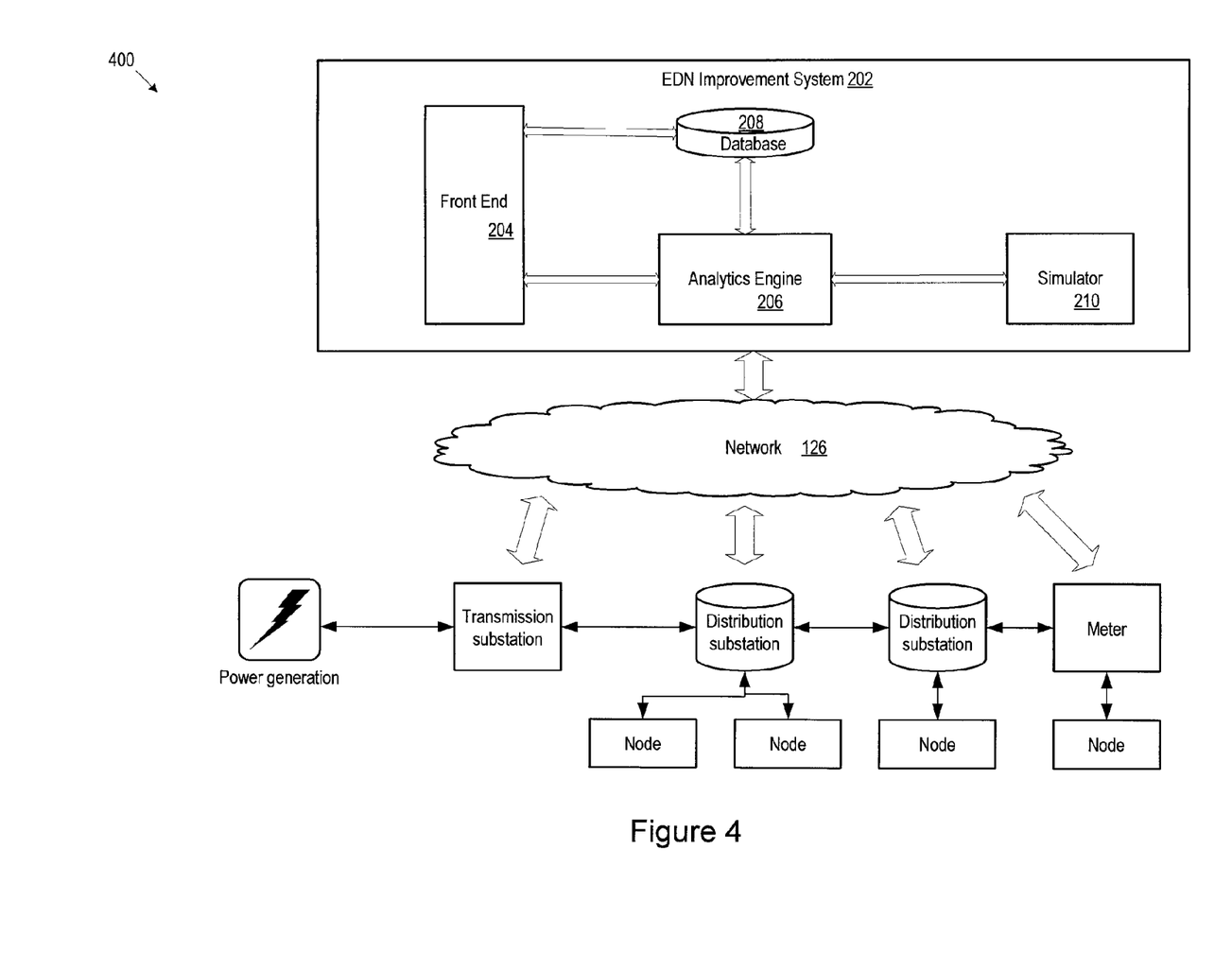
FIG. 4 shows a view of the system integrated with the EDN.

FIG. 4 shows the system 202 integrated with the EDN. In an embodiment, the system 202 may be integrated within the EDN operator center 128 and in communication with the rest of the EDN via network 126. However, the system 202 may be implemented as a separate system separate from the EDN and in communication with it. In another embodiment, only the front end may be integrated with the EDN operator center 128, and the front end may be remotely in communication with the database 208 and the analytics engine 206.

After all of the simulations are complete and the results are interpreted by the analytics engine 206, the analytics engine may determine, based on the results, one or more improvement programs which may address the problems identified or improve the operation of the EDN. The one or more improvement programs may be directed to one or more goals, such as minimizing power loss, voltage dip, and avoiding asset overload within the EDN. Such improvement program may include:

1. Upgrading assets to support the additional load: prioritization of asset investments for transformers and conductors upgrade when the assets are operating over the capacity or adding capacitor banks when there is a voltage loss.

2. Reducing impact by changing driver behavior: enforcing different charging controls—day/night tariff, real-time pricing or price-schedule v. smart metering system.

3. Advising new charging locations based on travel patterns, places of interest, potential buyer's locations and grid capacity.

The improvement program may also be directed to helping utilities plan for vehicle-to-grid ("V2G") feature and maximize their benefits while retaining enough energy in PEVs for driving needs. Utilizing V2G may allow the EDN to draw energy stored in the PEVs as necessary, allowing for a more efficient and flexible use of electrical energy. Improvement programs may be directed to improve the efficient use of the V2G feature. Such improvement programs may include:

1. Upgrading network topology and assets to minimize the use of generation plants.

2. Maximizing benefits by changing driver behavior: encourage PEV drivers to remain connected to the grid when parked, even if the vehicle does not need to be charged. Feed-in tariffs may be used to implement this feature.

3. Dispatching of vehicles: timing and control of V2G to match system needs—drawing electricity from fleets with scheduled usage (from a fixed location), and synchronizing charging with renewable sources.

Further, the improvement program may include utilizing the demand response system 130 to determine allocations of electricity usage for certain nodes and controlling the electricity flow to the nodes based on the allocations. The demand response system 130 may also monitor the status of the EDN in real time and dynamically allocate the electric resources to keep the electricity usages in conformity with the determined allocations.

The above improvement programs are exemplary and more or different improvement programs may be developed and implemented. After the analytics engine 206 determines one or more improvement programs, the analytics engine 206 may iterate through the process. For example, the analytics engine 206 may update the EDN configuration files to reflect the improved EDN, and run the simulation again with the improved EDN configuration. Once the new results are interpreted, the analytics engine 206 may determine whether the improvement program will be implemented in the actual EDN. If the analytics engine 206 determines the improvement program will be implemented, instructions may be communicated to the EDN operator center 128, and the EDN control system 132 in the EDN operator center may communicate to the various assets within the EDN to implement the improvement program. In an embodiment, when determining an improvement program and determining whether to apply the program to the EDN, the system 202 may also receive a decision from the user rather than a decision by the analytics engine 206.

Figure 5:
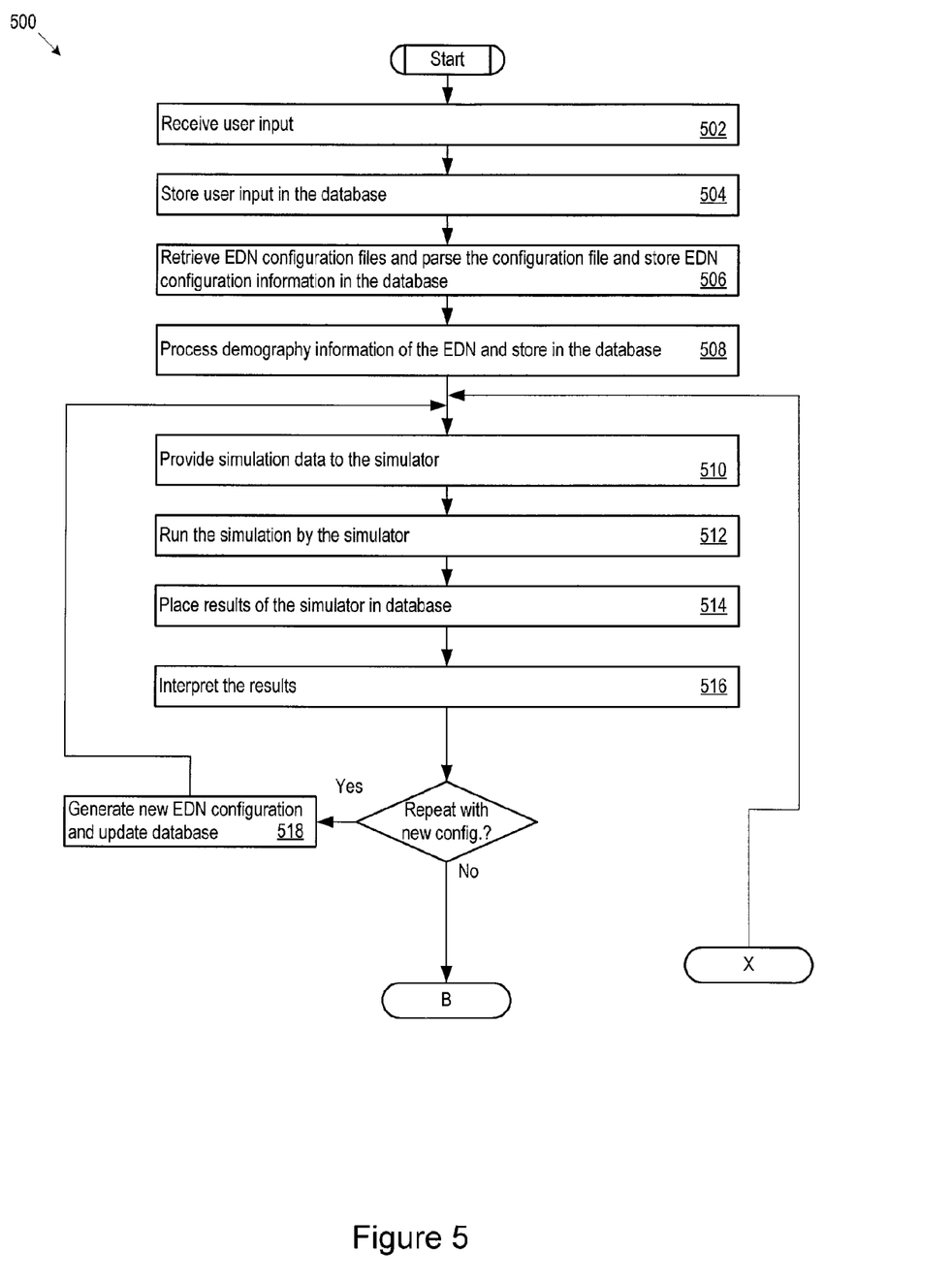
FIG. 5 shows a first part of the flow diagram of logic that the system may follow.

FIG. 5 shows a flow diagram 500 of the first part of the logic which the analytics engine 206 may follow during a typical operation. The front end 204 may receive one or more user inputs 302 (502). Then, the received user inputs may be stored in the database 208 (504). For example, the one or more user inputs 302 may be stored in the user_input table in the database 208. The main program 308 may then access the user_input table in the database 208 and retrieve the user input details.

The user input 302 discussed above may include the EDN configuration information and the demography information associated with the EDN configuration. The EDN configuration information may be processed by the network configuration manager 312 and placed into the database 208 such that it may be provided to the simulator 210 (506). In an embodiment the EDN configuration information may be provided in an EDN configuration file which the network configuration manager 312 may parsed and store the configuration in the database 208. Such EDN configuration file may be in a Glm format.

The network manager may also process the demography information associated with the EDN configuration and store the processed information in the database 208 to be provided to the simulator 210 (508). In an embodiment the demography information may be provided in an XML file, and that file may be parsed by network configuration manager 312 and placed in the database 208. If no XML file is provided, the network configuration manager 312 may compute the initial demography of each node of the EDN and store in the database 208.

Next, the simulation data is provided to the simulator 210 (510). The simulation data may include all or part of the input 302 discussed above. The simulation data may also include the EDN configuration information and the demography information discussed above. In an embodiment, script generator 314 may generate a script file to be passed to the simulator 210 based on the data stored in the database 208 and/or input 302 and provide the script file as the simulation data. Next the simulator 210 runs a simulation based on the simulation data (512). Load information for the simulation may be provided by the EDN configuration information, demography information, or computed by the network configuration manager 312 based on the user input 302. Next, the simulation is run by the simulator 210, which may generate the results (512). Solutions such as, for example, GridLab-D, OpenDSS and CYME/CYMDIST may be used as the simulator 210.

The results may be accessed by making a method or process call to the simulator 210 or the simulator 210 may generate a result file containing the results. The results may first be stored in the database 208 (514). If a result file is generated, the simulation result parser 316 or the result interpreter 318 may parse the file and store the parsed results into the database 208. Next, the results interpreter 318 interprets the results stored in the database 208 (516). In an embodiment, the result interpreter 318 may obtain the results to interpret by placing a method or process call to the simulator 210, rather than obtaining the results from the database 208. The results interpreter 316 may determine whether the network assets are aging, detect any over capacity situations, detect any faults on recloser/fuse, and/or detect any voltage drops. Overcapacity and faults on recloser/fuse may be determined based on the Equations 10-15 discussed above. Aging may be estimated from the IEEE standard C57.91-1995 load-dependent failure rate given the load on the transformer and ambient temperature. Various other methods may be used to estimate aging.

Voltage drops may be determined by comparing current voltage to historical voltages in the database. In determining appropriateness of voltage deviations, norm EN50160 may be used. Norm EN50160 is a European standard on voltage characteristics of electricity supplied by public distribution systems issued by CENELEC in November 1994, in order to promote a common understanding and interpretation among the electricity distributors. According to this norm, voltage deviations should be less than 10% for 95% of the time. Other types of norms that may exist may be used as well.

Afterwards, a signal may be sent to the front end 204 to alert the end of the base load simulation.

Next the main program 308 may simulate the EDN with new configurations including modified assets or higher loads to handle for nodes. First, the main program 308 may generate a new configuration with the new load of the EDN with network configuration manager 312 (518). The PEV load model 212 may be used for computing the new load. Next, the steps 510-516 are repeated.

Steps 510-518 may be repeated multiple times in an iterative process. For example, steps 510-518 may be repeated k times, where k is defined as in the following equation 15:

$$k = \frac{EndDate - StartDate}{Frequency} \qquad \text{Equation 15}$$

At the end of those k simulations, a signal is sent to the front end 204 to alert the end of all simulations.

Figure 6:
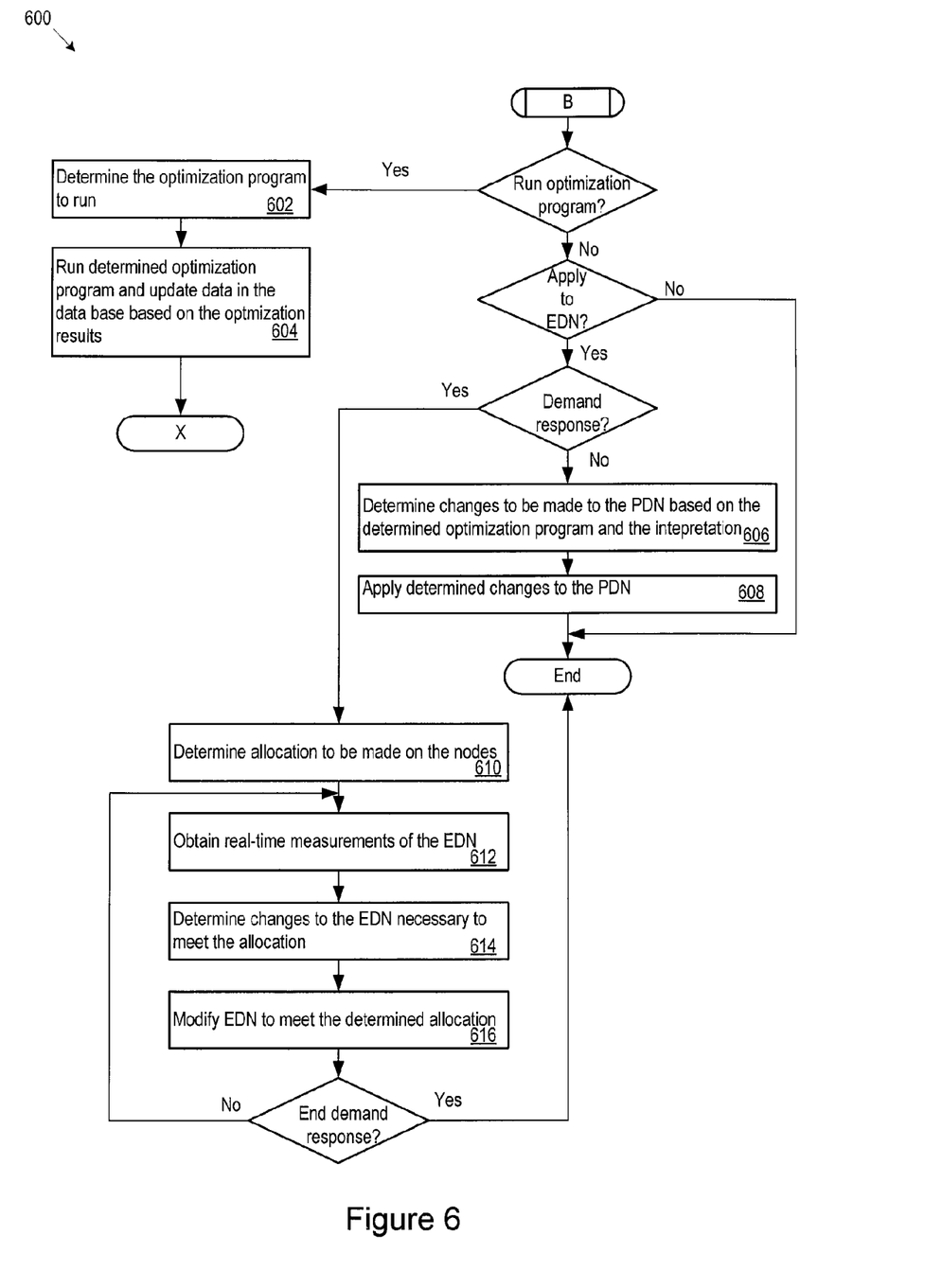
FIG. 6 shows a second part of the flow diagram of logic that the system may follow.

FIG. 6 show the flow diagram 600 showing the second half of the logic which the analytics engine 206 may follow during a typical operation.

After the main program 308 determines that steps 510-518 will not be repeated, the main program further determines whether to run an improvement program. If the main program 308 determines to run an improvement program, the main program further determines an appropriate improvement program to be run (602). In an embodiment, the main program 308 may also receive an input from the user indicating whether or not to run an improvement program and a selection on which improvement programs to run. The various improvement programs are discussed above in the previous sections. Next, the main program 308 runs the determined improvement programs and updates the network configuration information and the demography information based on the determined improvement program (604). Afterwards, steps 510-518 are repeated with the updated data.

When the simulation with the updated data is complete, the main program 308 may determine whether or not to apply the improvement program to the actual EDN. If the improvement programs are determined to be applied, the main program 308 determines the changes to be made to the assets of the EDN based on the contents of the improvement program and the interpretation results (606). Next, the main program communicates with the EDN control system 132 to communicate with the various assets of the EDN to implement the changes determined at step 606 (608).

After determining to apply the changes to the EDN, the main program 308 may determine to apply the changes using the demand response system 130. In this case, the main program 308 may communicate with the demand response system 130 to determine allocations of electricity usage for certain nodes in the EDN based on the interpretation results (610). Next, the demand response system 130 may obtain real-time measurements of the EDN (612). The measurements may be obtained through the EDN control system 132, or through other meters such as meters such as meter 116. The measurements may include, for example, power usage on each node, voltage drops, and number of PEVs connected to the nodes in the EDN. Next the demand response system 130 may determine any changes to be made to the EDN necessary to meet the allocation determined in step 610 (614). The changes may include, for example, limiting power consumption at a certain node, or limiting power drawn from a PEV connected to a certain node. Then, the demand response system 130 may communicate with the EDN control system 132 to make the necessary changes to the EDN in step 614 (616). Afterwards, the main program 308 may determine whether or not to continue usage of the demand response system 130. If the main program 308 determines to continue demand response, then the process is repeated from step 612. If not, the process ends.

The demand response system 130 may be implemented in the EDN operation center 128, or may be implemented separate from the EDN operation center. In an embodiment, the demand response system 130 may be integrated with the system 202, specifically with the analytics engine 206.

Figure 7:
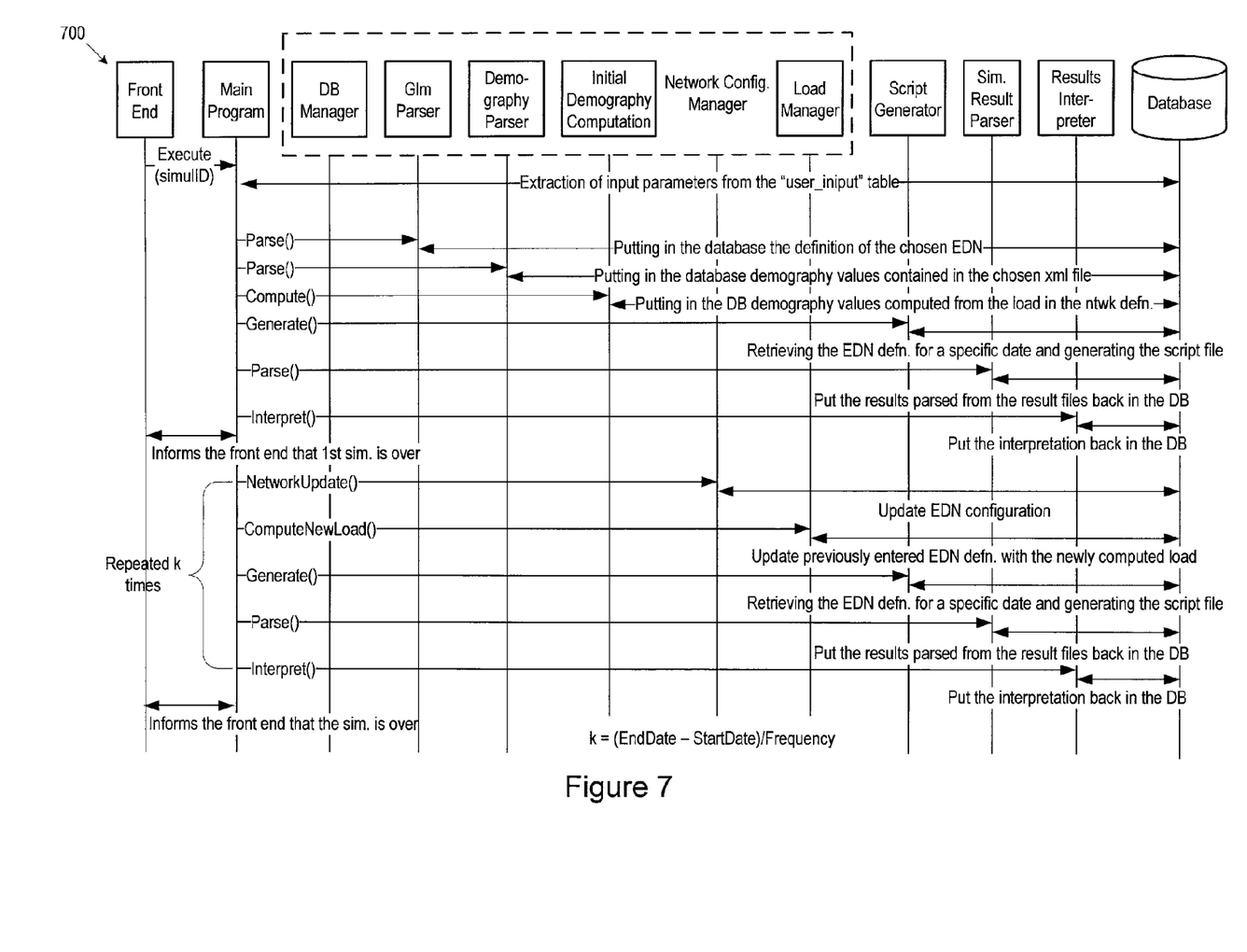
FIG. 7 shows sequence diagram of logic that the system may follow.

FIG. 7 shows a sequence diagram 700 of the operation of the analytics engine representing steps 502-518 according to an embodiment.

The implementation discussed above is exemplary. Other implementations may vary any of the supported systems of provided services noted above. For example, other implementations may use different types of systems, types of infrastructure hosting the system.

The system described above may be implemented in any combination of hardware and software. For example, programs provided in software libraries may provide the functionality that forms programs, workflows, or classes. Such software libraries may include dynamic link libraries (DLLs), or other application programming interfaces (APIs). The logic described above may be stored on a computer readable medium, such as a CDROM, hard drive, floppy disk, flash memory, or other computer readable medium. The logic may also be encoded in a signal that bears the logic as the signal propagates from a source to a destination.

In addition, the system may be implemented as a particular machine. For example, the particular machine may include a CPU, GPU, and software library for carrying out the functionality that forms the workflows, classes or other functions noted above. Thus, the particular machine may include a CPU, a GPU, and a memory that stores the logic described above.

While various embodiments of the disclosure have been described, it will be apparent to those of ordinary skill in the art that many more embodiments and implementations are possible within the scope of the disclosure. Accordingly, the disclosure is not to be restricted except in light of the attached claims and their equivalents.

We claim:

1. An electrical distribution network improvement method comprising:
   receiving, by a processor, user input, wherein the user input comprises electrical distribution network (EDN) configuration information, load information, and demographic information of a geographic area to which the EDN distributes electric power;
   calculating, by the processor, dynamic plug-in electric vehicle ("PEV") load information in the EDN, the PEV load information calculated based on the demographic information that comprises life-expectancy of plug-in electric vehicles (PEVs) being used in the geographic area, wherein calculating the PEV load information further comprises:
      calculating a number of PEVs likely to be recycled based on the life-expectancy of the PEVs currently used in the geographic area; and
      calculating an additional number of PEVs likely to be owned by a population in the geographic area based on the demographic information, the demographic information comprising activity profiles of the population in the geographic area;
   updating, by the processor, the load information with the PEV load information;
   performing, by the processor, a simulation using a simulator based on the EDN configuration information, the demographic information and the load information to obtain a simulation result;
   analyzing, by the processor, the simulation result using an analytics engine to obtain an interpretation result;
   determining, by the processor, an improvement program for the EDN based on the interpretation result; and
   modifying the EDN by applying the improvement program to the EDN.

2. The method of claim 1, wherein applying the improvement program to the EDN comprises:
   based on a request for usage allocation to be made in one or more nodes of the EDN, obtaining one or more real-time measurements of the EDN;
   determine at least one change to a node comprising at least one plug-in electric vehicle ("PEV") in order to meet the usage allocation; and
   modifying the EDN based on the determined at least one change to the node.

3. The method of claim 1, further comprising:
updating, by the processor, at least one of EDN configuration information, demographic information, or load information;
performing, by the processor, a second simulation using the simulator based on the updated at least one of the EDN configuration information, the demography information or the load information to obtain a second simulation result; and
analyzing, by the processor, the second simulation result using the analytics engine to obtain a second interpretation result.

4. The method of claim 1, wherein calculating the PEV load information further comprises:
calculating change in use of load based on expected change in population in a specific range of time based on the demographic information.

5. The method of claim 1, wherein, the improvement program comprises changes to the EDN configuration to encourage altered behavior of a population that receives electric power from the EDN.

6. The method of claim 5, wherein the improvement program is identified based on the demographic information.

7. The method of claim 6, wherein the improvement program comprises at least one of:
a new tariff structure for a specific range of time;
new charging locations within the EDN; or
an upgrade to equipment in the EDN.

8. A system comprising:
a memory storage device configured to store a database comprising:
EDN configuration information, the EDN comprising multiple nodes;
demographic information of the multiple nodes, the demographic information from a particular time, and the demographic information of a first node comprises information of users within an area of power distribution of the first node;
load information of the multiple nodes, the load information from the particular time; and
plug-in electric vehicle (PEV) estimation information comprising, PEV penetration rate, PEV evolution rate, PEV inflexion date, PEV life expectancy, annual increase in load to charge a PEV, and number of PEV sales;
circuitry configured to calculate PEV load information for the first node at a time different from the particular time based on analysis of the demographic information of the first node, the PEV estimation information, and load information of the first node on the particular time;
circuitry configured to simulate a configuration of the EDN using the calculated PEV load information in addition to the load information of the multiple nodes; and
circuitry configured to analyze the simulated EDN configuration to identify an improvement in the simulated EDN configuration, wherein the improvement prevents overload of equipment in the EDN.

9. The system of claim 8, wherein the improvement in the simulated EDN configuration comprises addition of a control structure for PEV charging, within the area of power distribution of the first node, based on the simulated EDN configuration.

10. The system of claim 9, wherein the control structure comprises a tariff structure, the tariff structure being based on driving patterns of the users within the area of power distribution of the first node.

11. The system of claim 8, wherein the improvement comprises identification of a new PEV charge station location, within the area of power distribution of the first node, based on the simulated EDN configuration and the demographic information of the area of power distribution of the first node.

12. The system of claim 8, further comprising:
circuitry to synchronize power supplied from renewable sources to the first node based on PEV charge time patterns of the users within the area of power distribution of the first node.

13. Non-transitory computer readable storage medium comprising instructions executable by a processor, the instructions comprising:
instructions to receive information about an electrical distribution network (EDN), the information comprising an EDN configuration, the EDN configuration comprising a topology of multiple power distribution nodes, each power distribution node responsible to supply power to a respective geographic area;
instructions to receive demographic information of a power distribution node of the EDN, the demographic information comprising demographic information of users within the geographic area receiving power from the power distribution node;
instructions to receive load information of the power distribution node;
instructions to receive plug-in electric vehicle (PEV) information including average energy consumption to charge a PEV, and information related to a number of plug-in electric vehicles (PEVs) sales within the geographic area;
instructions to calculate a number of PEVs estimated to be charged in the geographic area of the power distribution node, the number of PEVs calculated based on the demographic information, the PEV information, and a number of PEVs likely to be recycled based on life-expectancy of the PEVs currently used in the geographic area;
instructions to calculate a change in a power distribution pattern of the power distribution node based on the number of PEVs estimated to be charged within the geographic area of the power distribution node;
instructions to calculate an updated load information of the power distribution node based on the changed power distribution pattern and the load information;
instructions to simulate the EDN with the updated load information; and
instructions to analyze the simulation and output a result that includes a modification to the power distribution node in response to the updated load information of the power distribution node.

14. The non-transitory computer readable storage medium of claim 13, wherein the modification to the power distribution node comprises provision of PEV charging stations at locations different than those in a current topology of the power distribution node.

15. The non-transitory computer readable storage medium of claim 14, wherein the different locations of the PEV charging stations are based on driving patterns, places of interest, and EDN capacity in the geographic area corresponding to the power distribution node.

16. The non-transitory computer readable storage medium of claim 13, wherein the modification to the power distribution node comprises instructions to implement a tariff plan associated with PEV charging within the geographic area of the power distribution node.

17. The non-transitory computer readable storage medium of claim 16, wherein the tariff plan comprises an incentive to connect a PEV to the EDN during a specified time period.

18. The non-transitory computer readable storage medium of claim 17, wherein the tariff plan provides feed-in tariffs as incentives.

19. The method of claim 1, wherein the PEV load information is calculated based on plug-in electric vehicle (PEV) estimation information comprising, PEV penetration rate, PEV evolution rate, PEV inflexion date, annual increase in load to charge a PEV, and number of PEV sales.

20. The system of claim 8, wherein the PEV load information for the first node comprises:
 determining a number of PEVs likely to be recycled based on life-expectancy of the PEVs currently used in the area of power distribution of the first node; and
 determining an additional number of PEVs likely to be owned by a population in the area of power distribution of the first node.

21. The non-transitory computer readable storage medium of claim 17, wherein the additional number of PEVs is predicted based on PEV estimation information comprising, PEV penetration rate, PEV evolution rate, PEV inflexion date, annual increase in load to charge a PEV, and number of PEV sales.

22. The non-transitory computer readable storage medium of claim 13, further comprising:
 instructions to calculate an additional number of PEVs predicted to be in the geographic area based on the demographic information; and
 instructions to calculate the change in the power distribution pattern of the power distribution node based on the additional number of PEVs predicted.

* * * * *